United States Patent
Schloemmer et al.

(10) Patent No.: US 8,429,312 B2
(45) Date of Patent: Apr. 23, 2013

(54) SYSTEM AND METHOD FOR ARCHIVING OF DATA

(75) Inventors: Peter Schloemmer, Reinbek (DE);
Andreas Floeter, Hamburg (DE);
Helmut Ehrlichmann, Pinneberg (DE);
Thomas Oestreich, Hamburg (DE);
Gunnar Wiebecke, Hamburg (DE)

(73) Assignee: Airbus Operations GmbH (DE)

( * ) Notice: Subject to any disclaimer, the term of this patent is extended or adjusted under 35 U.S.C. 154(b) by 139 days.

(21) Appl. No.: 12/744,158

(22) PCT Filed: Nov. 29, 2007

(86) PCT No.: PCT/EP2007/063019
§ 371 (c)(1),
(2), (4) Date: Aug. 10, 2010

(87) PCT Pub. No.: WO2009/068101
PCT Pub. Date: Jun. 4, 2009

(65) Prior Publication Data
US 2011/0029747 A1 Feb. 3, 2011

(51) Int. Cl.
*G06F 3/00* (2006.01)
*G06F 15/16* (2006.01)

(52) U.S. Cl.
USPC ............................... 710/17; 709/227

(58) Field of Classification Search ............ 710/17
See application file for complete search history.

(56) References Cited

U.S. PATENT DOCUMENTS

| | | | |
|---|---|---|---|
| 5,193,093 A | 3/1993 | Okazaki | |
| 5,463,735 A | 10/1995 | Pascucci et al. | |
| 6,625,652 B1 * | 9/2003 | Miller et al. | 709/227 |
| 6,628,625 B1 * | 9/2003 | Birdwell et al. | 370/270 |
| 7,460,533 B1 * | 12/2008 | Tripathi et al. | 370/390 |
| 2003/0041049 A1 | 2/2003 | Berry et al. | |
| 2003/0069930 A1 * | 4/2003 | Van Willigen | 709/204 |
| 2005/0089035 A1 * | 4/2005 | Klemets et al. | 370/390 |
| 2006/0104300 A1 | 5/2006 | Ho | |

FOREIGN PATENT DOCUMENTS

| | | |
|---|---|---|
| CA | 2314529 A1 | 2/2001 |
| CN | 1284809 A | 2/2001 |
| EP | 1802012 A2 | 6/2007 |
| GB | 1164531 A | 9/1969 |
| JP | H10512726 A | 12/1998 |
| JP | 2002124992 A | 4/2002 |
| JP | 2005056470 A | 3/2005 |
| JP | 2005301979 A | 10/2005 |

(Continued)

*Primary Examiner* — Henry Tsai
*Assistant Examiner* — Titus Wong
(74) *Attorney, Agent, or Firm* — Lerner, David, Littenberg, Krumholz & Mentlik, LLP

(57) ABSTRACT

The invention relates to a method, a system and a computer program for archiving of data. An announcement signal, which identifies the data, which have to be archived, is sent from a source system to a destination system. A feedback signal, which identifies the announcement signal received by the destination system, is sent from the destination system to the source system, wherein it is determined from the feedback signal whether the announcement signal has been received by the destination system correctly. If it has been determined that the announcement signal has not been correctly received, at least parts of the announcement signal are resent from the source system to the destination system. The data identified by the announcement signal are sent from the source system to the destination system for archiving of data.

7 Claims, 2 Drawing Sheets

FOREIGN PATENT DOCUMENTS

| | | |
|---|---|---|
| JP | 2006065710 A | 3/2006 |
| JP | 2007226750 A | 9/2007 |
| RU | 2182360 | 5/2002 |
| RU | 2298237 | 4/2007 |
| WO | 9618960 | 6/1996 |
| WO | 2004034396 | 4/2004 |

* cited by examiner

SYSTEM AND METHOD FOR ARCHIVING OF DATA

CROSS-REFERENCE TO RELATED APPLICATIONS

This application is a national phase entry under 35 U.S.C. §371 of International Application No. PCT/EP2007/063019, filed Nov. 29, 2007, published in English, the disclosure of which application is hereby incorporated by referenced herein.

TECHNICAL FIELD

The invention relates to a system, a method and a computer program for archiving of data.

PRIOR ART

It is known, that an system for archiving of data comprises a source system and a destination system. Data, in particular, documents, which have to be archived, are sent from the source system to the destination system together with an attribute file, which identifies the data unambiguously. The destination system archives the received data, for example, on a write-once-read-multiple device (WORM). The attribute file is used as a key to find the data on the destination system. If an error occurs during the transfer of the attribute file from the source system to the destination system, the attribute file received by the destination system can be corrupted such that the data received from the destination system cannot be found anymore on the destination system, i.e. the data on the destination system are lost.

SUMMARY OF THE INVENTION

It is therefore the object of the invention to provide a method, a system and a computer program for archiving of data, which yield an improved data integrity.

This object is archived by a method for archiving of data, wherein an announcement signal, which identifies the data which have to be archived, is sent from a source system to a destination system,
wherein a feedback signal, which identifies the announcement signal received by the destination system, is sent from the destination system to the source system
wherein it is determined from the feedback signal whether the announcement signal has been received by the destination system correctly,
wherein at least parts of the announcement signal, which have not been correctly received by the destination system, are resent from the source system to the destination system, if it has been determined that the announcement signal has not been correctly received,
wherein the data identified by the announcement signal are sent from the source system to the destination system for archiving of data.

Since from the feedback signal it is determined, whether the announcement signal has been received by the destination system correctly, and since, if the announcement signal has not been received by the destination system correctly, at least corrupted parts of the announcement signal are resent from the source system to the destination system, the probability, that the announcement signal has not been received by the destination system correctly, is reduced. The announcement signal is preferentially used as a key, which identifies the data on the destination system unambiguously, i.e., the announcement signal is used to find data on the destination system. Therefore, since the probability of the occurrence of a corrupted announcement signal is reduced, the probability of a data loss due to a corrupted key is reduced, and the data integrity is improved.

According to a preferred embodiment, at least parts of the announcement signal, which have not been received by the destination system correctly, are resent from the source system to the destination system, until the announcement signal has been received by the destination system correctly.

Since at least parts of the announcement signal are resent until the announcement signal has been received by the destination system correctly, the probability of a finally corrupted announcement signal on the destination system is further reduced, wherein the data integrity is further improved.

According to a further embodiment, after the data have been archived on the destination system, an acknowledgement signal, which identifies the data archived on the destination system, is sent from the destination system to the source system, wherein at least parts of the data, which have not been received by the destination system correctly, are resent from the source system to the destination system. This also further improves the data integrity on the destination system.

It is preferred that parts of the data, which have not been received by the destination system correctly, are resent from the source system to the destination system, until the data have been received by the destination system correctly. This also further improves the data integrity on the destination system.

It is further preferred, that the same data are archived on a write-once-read-multiple device. Since data are only recorded one time on such a write-once-read-multiple device, data can be archived for a long time without becoming corrupted.

It is further preferred, that the same data are archived on several write-once-read-multiple devices. Since, if the data archived on one write-once-read-multiple device are corrupted, the data can be read from another write-once-read-multiple device, the data integrity is further improved. In an embodiment according to the invention, the acknowledgement signal is sent to the source system, after it has been confirmed, that the data have been archived on the several write-once-read-multiple devices correctly. Also this further improves the data integrity.

The above mentioned objects are also achieved by a system for archiving of data for carrying out the method according to the invention, wherein this system comprises:
- a source system for providing data, which has to be archived,
- a destination system for archiving the data,
- first sending means for sending an announcement signal, which identifies the data which have to be archived, and for resending at least parts of the announcement signal, which have not be received by the destination system correctly, from the source system to the destination system, if it has been determined that the announcement signal has not been correctly received,
- second sending means for sending a feedback signal, which identifies the announcement signal, from the destination system to the source system,
- determination means for determining from the feedback signal whether the announcement signal has been received by the destination system correctly,
- third sending means for sending data identified by the announcement signal from the source system to the destination system.

Preferentially the system for archiving of data is adapted to carry out one or several of the above mentioned preferred steps or embodiments of the method for archiving of data according to the invention.

The above mentioned objects are further achieved by a source system for providing data, which has to be archived, wherein the source system comprises:

first sending means for sending an announcement signal, which identifies the data which have to be archived, and for resending at least parts of the announcement signal, which have not be received by a destination system for archiving of data correctly, from the source system to the destination system, if it has been determined that the announcement signal has not been correctly received, determination means for determining from a feedback signal, which has been sent from a second means for sending a feedback signal from the destination system to the source system, whether the announcement signal has been received by the destination system correctly, third sending means for sending data identified by the announcement signal from the source system to the destination system.

Preferentially the source system for providing data is adapted to carry out one or several of the above mentioned preferential steps or embodiments of the method for archiving of data according to the invention.

The above mentioned objects are further achieved by a destination system for archiving of data, wherein the destination system comprises second sending means for sending a feedback signal, which identifies an announcement signal, which identifies the data which have to be archived, from the destination system to a source system.

The destination system is preferentially adapted to carry out one or several of the preferred steps or embodiments of the method for archiving of data according to the invention.

The above mentioned objects are further achieved by a computer program for archiving data carrying out the steps of the method according to the invention, when the computer program is run on a computer, wherein this computer program comprises:

first program code means for providing data, which has to be archived, on a source system, second program code means for archiving the data on a destination system, third program code means for sending an announcement signal, which identifies the data which have to be archived, and for resending of at least parts of the announcement signal, which have not be received by the destination system correctly, from the source system to the destination system, if it has been determined that the announcement signal has not been correctly received, fourth program code means for sending a feedback signal, which identifies the announcement signal, from the destination system to the source system, fifth program code means for determining from the feedback signal whether the announcement signal has been received by the destination system correctly, sixth program code means for sending data identified by the announcement signal from the source system to the destination system.

The computer program is preferentially adapted to carry out one or several of the preferred steps or embodiments of the method for archiving of data according to the invention.

BRIEF DESCRIPTION OF THE DRAWING

The invention will now be described with respect to the drawing, in which.

PREFERRED EMBODIMENTS OF THE INVENTION

Figure 1:
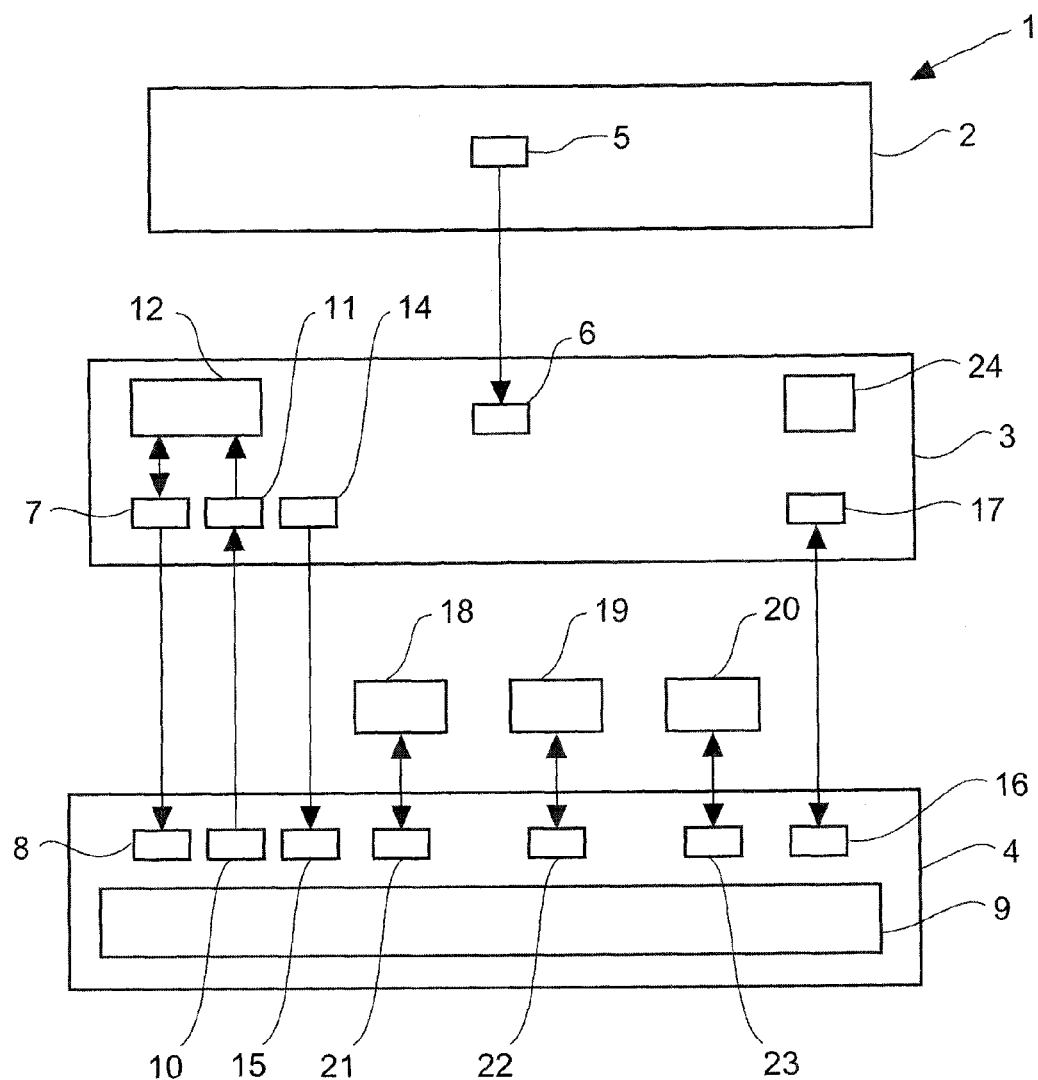
FIG. 1 is a schematic view of a system for archiving of data according to the invention and FIG. 2 is a flow chart illustrating a method for archiving of data according to the invention.

FIG. 1 shows a schematically a system 1 for archiving of data. The system comprises a creation system 2, a source system 3 and a destination system 4. The creation system 2 creates data, for example, documents like WORD documents. The creation system 2 comprises a sending means 5 for sending the data created on the creation system 2 to the source system 3. The source system 3 comprises a receiving means 6 for receiving the data. The source system 3 generates an announcement signal depending on the data received from the creation system 2 by the receiving means 6. The announcement signal comprises preferentially an attribute file, wherein the attribute file comprises preferentially the name of the file of the data, i.e. of the data file and further attributes, which identify the corresponding data file unambiguously. For example, if the data file contains a document being a constructional drawing used to build, for instance, an aircraft, the attribute file can comprise the aircraft type, a material number of the material shown on the constructional drawing, etc.

The source system 3 comprises further sending means 7 (first sending means) for sending the announcement signal from the source system 3 to the destination system 4. Thus, preferentially an attribute file is sent from the source system 3 to the destination system 4. The announcement signal is received by a receiving means 8 of the destination system 4. After the sending means 7 has sent the announcement signal to the destination system 4, the sending means 7 sends an end signal to the destination system 4. Also the end signal is received by the receiving means 8 indicating that the transfer of the announcement signal from the source system 3 to the destination system 4 has been completed. The announcement signal is imported into the data bank 9 of the destination system 4. The destination system 4 generates a feedback signal comprising information which identify the announcement signal received by the receiving means 8 of the destination system 4. The destination system comprises further a sending means 10 (second sending means) for sending the feedback signal from the destination system 4 to the source system 3. The feedback signal is received by receiving means 11 of the source system 3.

The source system 3 comprises further determination means 12 for the determination, whether the announcement signal identified by the feedback signal is identical to the announcement signal generated on the source system 3. For example, the feedback signal can comprise the announcement signal received by the receiving means 8 of the destination system 4. Thus, by comparing the feedback signal with the announcement signal generated on the source system 3, it can easily be determined, whether the announcement signal has been received by the destination system 4 correctly.

The source system 3 comprises a further sending means 14 (third sending means) for sending the data, which have to be archived, from the source system 3 to the destination system 4. The data are received on the destination means 4 by a receiving means 15. The data are sent together with the announcement signal from the sending means 14 to the receiving means 15. The destination system 4 compares the announcement signal, which was sent from the sending means 7 to the receiving means 8 with the announcement signal, which has been sent together with the data from the sending means 14 to the receiving means 15. If these two announcement signals differ from each other, an acknowledgement signal is sent from a further sending means 16 of the destination system to the source system 3. The source system 3 comprises a further receiving means 17 for receiving the acknowledgment signal. The acknowledgement signal comprises in this case information, which indicate that an error has been occurred during the transfer of the data and/or the announcement signal from the sending means 14 to the receiving means 15. In this case, the source means 3 can be adapted to resend the data and/or the announcement signal to the destination system 3.

The system 1 for archiving of data comprises further a means 18 for generating a signature for the data. If the data are documents, for each document a signature is determined by the means 18 for generating a signature. The means 18 for generating a signature can be a computer system which generates a hash from the data, in particular, from the documents, by using a hash program and by generating a crypting hash by a using a crypting program. The crypting hash is, for example, the signature. The invention is not limited to this generation of a crypting hash. Also other known signature means and methods can be used to generate a signature for the data. The means 18 for generating a signature communicates with the destination system 4 via a sending and receiving means 21.

The system 1 for archiving of data comprises further at least two write-once-read-multiple devices (WORM) 19, 20 for storing the data on theses WORMs 19, 20. The WORMs 19, 20 communicate with the destination system 4 via sending and receiving means 22 and 23.

Figure 2:
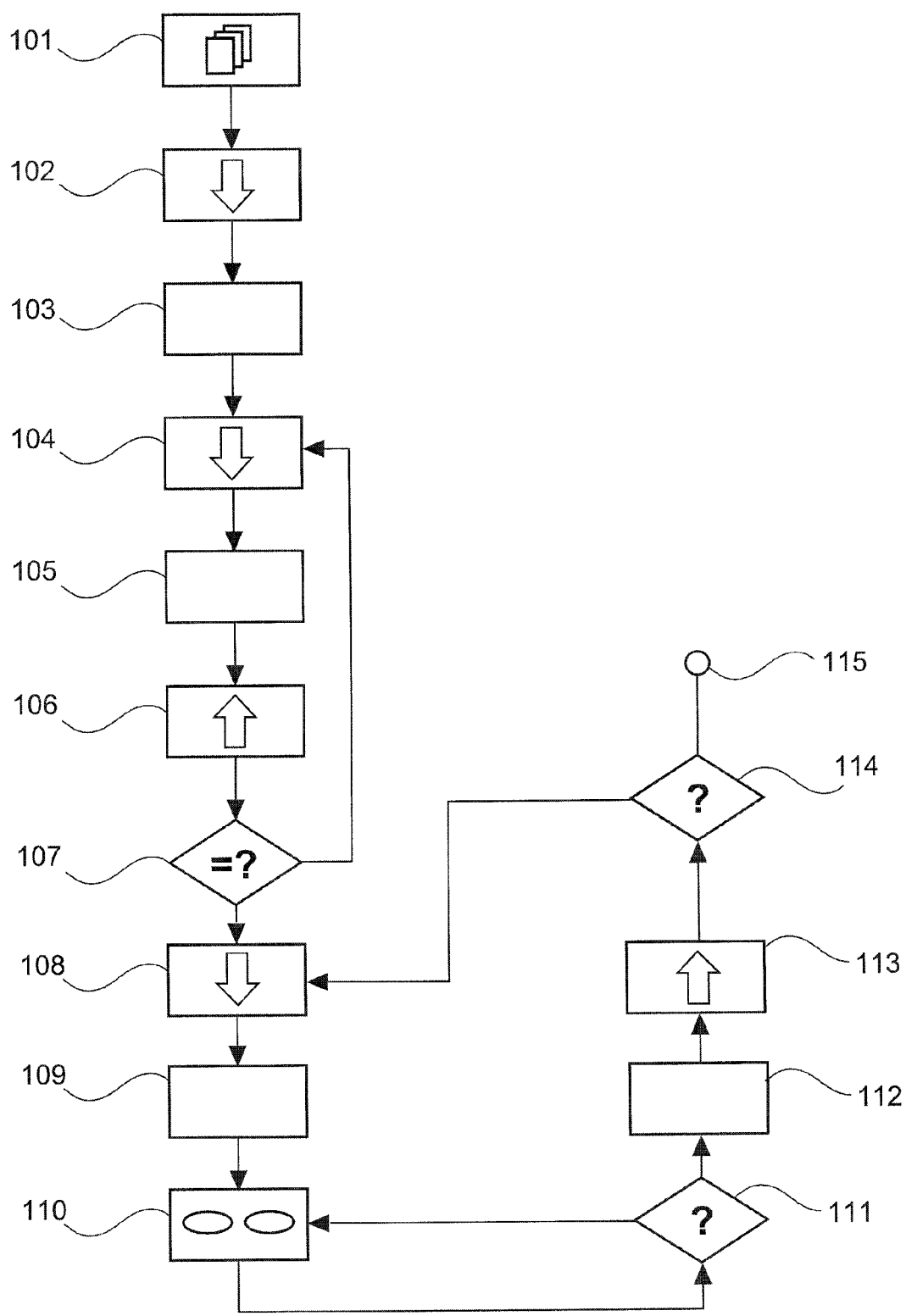

An embodiment of a method for archiving of data according to the invention will now be described in more detail with respect to the flow chart shown in FIG. 2.

In step 101 data are created by the creation system 3, which are in this embodiment documents.

In step 102 these documents are sent from the sending means 5 of the creation system 2 to the receiving means 6 of the source system 3.

In step 103 an announcement signal is generated, which identifies unambiguously the documents, which have to be archived. This announcement signal is sent from the source system 3 to the destination system 4 in step 104.

In step 105 a feedback signal is generated on the destination system 4, which identifies unambiguously the announcement signal received by the receiving means 8. In particular, the feedback signal comprises a copy of the announcement signal received by the receiving means 8. In step 106 the feedback signal is sent from the destination system 4 to the source system 3, and in step 107 the source system 3 compares the announcement signal generated on the source system 3 in step 103 with the announcement signal of the feedback signal received by the receiving means 11 of the source system 3. If theses announcement signals are not identical, the whole announcement signal generated on the source system 3 or parts of this announcement signal, which have not been received by the receiving means 8 of the destination system 4 correctly, are resent from the source system 3 to the destination system 4, i.e., the method according the invention continues with step 104, wherein preferentially only the incorrect parts are resent. If the announcement signal generated on the source system 3 and the announcement signal of the feedback signal are identical, the source system 3 will not send further announcement signals to the destination system 4 and, in particular, after the destination system 4 has waited for a predetermined time for a further announcement signal, the method continues with step 108. Alternatively, the sending means 7 can send a signal to the receiving means 8 indicating that the announcement signal generated on the source system 3 and the announcement signal of the feedback signal are identical, and the destination system 4 continues with step 108, after the receiving means 8 has received this signal.

In step 108 the sending means 14 of the source system 3 sends the documents, which have to be archived, together with the announcement signal to the destination system 4. The announcement signal comprises in this embodiment an attribute file, which includes the file names of the documents and further attributes, which identify the documents, which have to be archived, unambiguously.

If a signal, for instance, an announcement signal or a feedback signal or data, has been transferred, an end signal, which indicates that the transfer has been completed, is also sent.

In step 109 for each document a signature is generated, and in step 110 the documents are archived on the WORM devices 19, 20 together with the signature. In step 111 it is determined, whether the documents have been stored on each WORM 19, 20 correctly. This can for example be performed, if the signature is a crypting hash, by uncrypting the signature, which has been archived on the WORMs together with the respective documents, and by hashing the respective document. The hashing of the respective documents results in a first hash, and the uncrypting to the signature results in a second hash. If the first hash and the second hash are identical, the respective document has been archived correctly on the WORM. If each document has been archived on each WORM correctly, the method continues with step 112. If the document has not been archived correctly on a WORM, step 110 is repeated only with this document and the WORM, on which this document has not been archived correctly.

In step 112 the destination system 4 generates an acknowledgment signal, which comprises information indicating which documents have been archived correctly and which documents have not been archived correctly. The acknowledgment signal comprises preferentially an acknowledgment file which indicates for each document, whether the document has been archived correctly.

This acknowledgment signal is sent from the sending means 16 of the destination system 4 to the receiving means 17 of the source system 3 in step 113.

A determination means 24 of the source system 3 determines from the acknowledgment signal, whether all documents send to the destination system 4 have been archived correctly. Furthermore, if some documents have not been archived correctly, the determination means 24 determines which documents have not been archived correctly. In this embodiment, the acknowledgment signal is an acknowledgment file, wherein in each line of the file a document, which has been announced by the announcement signal, is identified by the attributes of the attribute file. Furthermore, each line contains an information indicating whether the document, which corresponds to the respective line, has been archived correctly or not. Thus, by reading the acknowledgment signal, i.e. in this embodiment the acknowledgment file, the determination means 24 can easily determine, whether a respective document has been archived correctly. If the document has not been archived correctly, the method continues with step 108, wherein only the documents are resent from the source system 3 to the destination systems 4, which have not been archived correctly. If all documents have been archived correctly, the method stops in step 115.

The system 1 for archiving of data is controlled by a computer program, which carries out the steps of the method according to the invention.

The invention is not limited to a system for archiving of data, which comprises a creation system. The system for archiving of data according to the invention can also comprise the source system and the destination system only.

The invention claimed is:

1. A method for archiving of predetermined data, comprising:
   sending, from a source system to a destination system, an announcement signal comprising information identifying the predetermined data to be archived;
   sending, from the destination system to the source system, a feedback signal comprising information identifying the announcement signal received by the destination system;
   determining from the feedback signal whether the announcement signal has been correctly received by the destination system;
   resending, from the source system to the destination system, at least parts of the announcement signal, if it has been determined that the announcement signal has not been correctly received, until the announcement signal has been correctly received by the destination system;
   sending, from the source system to the destination system, the predetermined data identified by the announcement signal together with the announcement signal;
   archiving all of the predetermined data together with the announcement signal on the destination system;
   sending, from the destination system to the source system, an acknowledgement signal comprising information identifying the predetermined data received by the destination system and indicating whether the predetermined data have been correctly archived,; and
   resending, from the source system to the destination system, at least parts of the predetermined data not correctly archived, until all of the predetermined data have been correctly archived on the destination system.

2. The method for archiving data of claim 1,
   archiving the predetermined data on a write-once-read-multiple device.

3. The method for archiving data of claim 2,
   archiving the same predetermined data on a plurality of write-once-read-multiple devices.

4. The method for archiving data of claim 3,
   sending the acknowledgement signal to the source system, after confirming that the predetermined data have been correctly archived on the plurality of write-once-read-multiple devices.

5. The method for archiving data of claim 1,
   assigning time stamps to the predetermined data.

6. A system for archiving of data for carrying out the method according to claim 1, said system comprising:
   the source system for providing the predetermined data to be archived, the source system comprising:
   first sending means for sending, from the source system to the destination system, the announcement signal, comprising information identifying the predetermined data to be archived, and for resending at least parts of the announcement signal not correctly received by the destination system from the source system, if it has been determined that the announcement signal has not been correctly received;
   first receiving means for receiving the feedback signal from the destination system;
   determination means for determining from the feedback signal whether the announcement signal has been correctly received by the destination system; and
   second sending means for sending, from the source system to the destination system, the predetermined data identified by the announcement signal together with the announcement signal;
   and,
   a destination system for archiving the predetermined data, comprising:
   second receiving means for receiving the announcement signal from the source system;
   third sending means for sending, from the destination system to the source system, a feedback signal, which identifies the announcement signal, which identifies the data which have to be archived; and
   third receiving means for receiving the predetermined data identified by the announcement signal together with the announcement signal.

7. A non-transitory computer-readable medium having stored thereon instructions that, when executed, directs a computer to:
   provide, on a source system, predetermined data to be archived;
   send, from the source system to a destination system, an announcement signal comprising information identifying the predetermined data;
   send, from the destination system to the source system, a feedback signal comprising information identifying the announcement signal received by the destination system;
   determine from the feedback signal whether the announcement signal has been correctly received by the destination system;
   resend, from the source system to the destination system, at least parts of the announcement signal, if it has been determined that the announcement signal has not been correctly received, until the announcement signal has been correctly received by the destination system;
   send, from the source system to the destination system, the predetermined data identified by the announcement signal together with the announcement signal;
   archive all of the predetermined data together with the announcement signal on the destination system;
   send, from the destination system to the source system, an acknowledgement signal comprising information identifying the predetermined data received by the destination system and indicates whether the predetermined data have been correctly archived; and
   resend, from the source system to the destination system, at least parts of the predetermined data not correctly archived, until all of the predetermined data have been correctly archived on the destination system.

* * * * *